United States Patent
Kulkarni et al.

(10) Patent No.: US 8,704,821 B2
(45) Date of Patent: *Apr. 22, 2014

(54) SYSTEM AND METHOD FOR MANAGING VIRTUAL WORLD ENVIRONMENTS BASED UPON EXISTING PHYSICAL ENVIRONMENTS

(75) Inventors: Gaurav N. Kulkarni, Denver, CO (US); Rick A. Hamilton, II, Charlottesville, VA (US); Anne R. Sand, Peyton, CO (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 586 days.

This patent is subject to a terminal disclaimer.

(21) Appl. No.: 12/233,059

(22) Filed: Sep. 18, 2008

(65) Prior Publication Data
US 2010/0066733 A1    Mar. 18, 2010

(51) Int. Cl.
*G06T 15/00* (2011.01)
*G06F 3/00* (2006.01)
*G06F 15/177* (2006.01)

(52) U.S. Cl.
USPC ............................ 345/419; 715/700; 715/734

(58) Field of Classification Search
USPC .................................. 345/419; 715/700–866
See application file for complete search history.

(56) References Cited

U.S. PATENT DOCUMENTS

| | | | |
|---|---|---|---|
| 4,323,772 A | 4/1982 | Serge | |
| 5,331,455 A | 7/1994 | Chang | |
| 5,426,282 A | 6/1995 | Humble | |
| 5,477,379 A | 12/1995 | Chang | |
| 5,513,264 A | 4/1996 | Wang et al. | |
| 5,583,686 A | 12/1996 | Chen | |
| 5,609,223 A | 3/1997 | Lizaka et al. | |
| 5,631,976 A | 5/1997 | Bolle et al. | |
| 5,635,697 A | 6/1997 | Shellhammer et al. | |
| 5,659,167 A | 8/1997 | Wang et al. | |
| 5,763,864 A | 6/1998 | O'Hagan et al. | |
| 5,811,774 A | 9/1998 | Ju et al. | |
| 5,815,200 A | 9/1998 | Ju et al. | |

(Continued)

FOREIGN PATENT DOCUMENTS

WO        0225506 A1    3/2002

OTHER PUBLICATIONS

Reesen, Virtual World technologies to manage a grid, http://www.gridforum.nl/files/gridforum_RickReesen_VirtualWorldTechnologiesToManageAGrid_20080402.pdf available on line Apr. 2, 2008.*

(Continued)

*Primary Examiner* — Xiao M. Wu
*Assistant Examiner* — Yingchun He
(74) *Attorney, Agent, or Firm* — Lisa Ulrich; Hoffman Warnick LLC

(57) ABSTRACT

In general, the present invention provides a system and method for creating, managing and utilizing virtual worlds for enhanced management of an Information Technology (IT) environment. Two dimensional (2D) and three dimensional (3D) virtual world renditions are automatically created to replicate the associated real-life IT environment. Such virtual environments can then be used to familiarize staff with remote locations and to securely provide virtual data center tours to others. The virtual environments are managed through an information monitor and management module that generates a work order sent to the physical location for reconfiguration of the real-life environment.

10 Claims, 9 Drawing Sheets

(56) References Cited

U.S. PATENT DOCUMENTS

| | | | |
|---|---|---|---|
| 5,883,968 | A | 3/1999 | Welch et al. |
| 5,918,211 | A | 6/1999 | Sloane |
| 6,026,376 | A * | 2/2000 | Kenney ............... 705/26.61 |
| 6,064,469 | A | 5/2000 | Brownstein |
| 6,122,409 | A | 9/2000 | Boggs et al. |
| 6,229,540 | B1 | 5/2001 | Tonelli et al. |
| 6,287,299 | B1 | 9/2001 | Sasnett et al. |
| 6,366,696 | B1 | 4/2002 | Hertz et al. |
| 6,504,481 | B2 | 1/2003 | Teller |
| 6,556,276 | B2 | 4/2003 | Staeheli et al. |
| 6,606,171 | B1 | 8/2003 | Renk et al. |
| 6,643,695 | B1 | 11/2003 | Takagi et al. |
| 6,721,769 | B1 | 4/2004 | Rappaport et al. |
| 6,726,094 | B1 | 4/2004 | Rantze et al. |
| 6,853,400 | B1 | 2/2005 | Matama |
| 6,991,158 | B2 | 1/2006 | Munte |
| 7,118,026 | B2 | 10/2006 | Harris et al. |
| 7,124,058 | B2 | 10/2006 | Namaky et al. |
| 7,145,457 | B2 | 12/2006 | Spitz et al. |
| 7,159,770 | B2 | 1/2007 | Onozu |
| 7,168,618 | B2 | 1/2007 | Schwartz |
| 7,196,624 | B2 | 3/2007 | Teller |
| 7,202,780 | B2 | 4/2007 | Teller |
| 7,286,971 | B2 | 10/2007 | Rappaport et al. |
| 7,298,378 | B1 | 11/2007 | Hagenbuch et al. |
| 7,334,729 | B2 | 2/2008 | Brewington |
| 7,337,960 | B2 | 3/2008 | Ostrowski et al. |
| 7,693,941 | B2 | 4/2010 | Battat et al. |
| 2001/0045463 | A1 | 11/2001 | Madding et al. |
| 2002/0004404 | A1 | 1/2002 | Squibbs |
| 2002/0013837 | A1 | 1/2002 | Battat et al. |
| 2002/0070861 | A1 | 6/2002 | Teller |
| 2002/0110374 | A1 | 8/2002 | Staeheli et al. |
| 2002/0121547 | A1 | 9/2002 | Wieth et al. |
| 2002/0161658 | A1 | 10/2002 | Sussman |
| 2002/0194074 | A1 | 12/2002 | Jacobs |
| 2003/0024982 | A1 | 2/2003 | Bellis et al. |
| 2003/0071725 | A1 | 4/2003 | Teller |
| 2003/0167242 | A1 | 9/2003 | Hamilton |
| 2004/0125396 | A1 | 7/2004 | Burke |
| 2004/0145614 | A1 | 7/2004 | Takagaki et al. |
| 2005/0015265 | A1* | 1/2005 | Price ............................. 705/1 |
| 2005/0081161 | A1 | 4/2005 | MacInnes et al. |
| 2005/0096855 | A1 | 5/2005 | Teller |
| 2005/0173527 | A1 | 8/2005 | Conzola |
| 2005/0189411 | A1 | 9/2005 | Ostrowski et al. |
| 2005/0200490 | A1 | 9/2005 | Teller |
| 2005/0211771 | A1 | 9/2005 | Onozu |
| 2005/0237213 | A1 | 10/2005 | Teller |
| 2006/0032915 | A1 | 2/2006 | Schwartz |
| 2006/0047835 | A1 | 3/2006 | Greaux |
| 2006/0106851 | A1* | 5/2006 | Warshawsky ............... 707/101 |
| 2006/0161390 | A1 | 7/2006 | Namaky et al. |
| 2006/0179164 | A1 | 8/2006 | Katibian et al. |
| 2006/0288133 | A1 | 12/2006 | Katibian et al. |
| 2006/0290980 | A1 | 12/2006 | Terada |
| 2007/0088630 | A1* | 4/2007 | MacLeod et al. ............. 705/28 |
| 2007/0107016 | A1 | 5/2007 | Angel et al. |
| 2007/0107017 | A1 | 5/2007 | Angel et al. |
| 2007/0107021 | A1 | 5/2007 | Angel et al. |
| 2007/0132756 | A1 | 6/2007 | Plocher et al. |
| 2007/0219645 | A1 | 9/2007 | Thomas et al. |
| 2007/0279244 | A1 | 12/2007 | Haughawout et al. |
| 2008/0027796 | A1 | 1/2008 | Chaves |
| 2008/0042828 | A1* | 2/2008 | Christopher ............. 340/539.13 |
| 2008/0059281 | A1 | 3/2008 | Tower et al. |
| 2008/0062167 | A1 | 3/2008 | Boggs et al. |
| 2008/0141755 | A1 | 6/2008 | Edwards |
| 2008/0198159 | A1 | 8/2008 | Liu et al. |
| 2009/0164618 | A1 | 6/2009 | Kudo |
| 2010/0066733 | A1 | 3/2010 | Kulkarni et al. |
| 2010/0245600 | A1 | 9/2010 | Chang et al. |

OTHER PUBLICATIONS

Bolle, "Veggie Vision: A Produce Recognition System", WACV, 1996, 4 pages.
Derwent, Web based ordering system for non-standardised goods e.g. fruit, vegetables provides view of item for selection and prints bar code on item for order processing, Jul. 10, 1998, Abstract, 2 pages.
Connell II et al., U.S. Appl. No. 12/052,051, Office Action Communication, Jan. 6, 2010, 24 pages.
Connell II et al., U.S. Appl. No. 12/052,051, Office Action Communication, Feb. 23, 2009, 13 pages.
Connell II, et al., U.S. Appl. No. 12/052,046, Office Action, Apr. 2, 2010, 13 pages.
Connell II, et al., U.S. Appl. No. 11/782,177, Final Office Action, Apr. 23, 2010, 18 pages.
Connell II, et al., U.S. Appl. No. 11/782,173, Examiner's Amendment, Apr. 30, 2010, 11 pages.
Connell II, et al., U.S. Appl. No. 11/756,391, Final Office Action, May 6, 2010, 18 pages.
Bolle et al., "Veggie Vision: A produce Recognition System", Produce Marketing Association, 8 pgs.
Connell II, "Item Scanning System", U.S. Appl. No. 11/782,173, filed Jul. 24, 2007.
Connell II, Office Action Communication, U.S. Appl. No. 11/782,173, May 27, 2009, 12 pages.
Connell II, Office Action Communication, U.S. Appl. No. 11/782,173, Nov. 27, 2009, 12 pages.
Connell II, Office Action Communication, U.S. Appl. No. 11/782,177, Nov. 24, 2009, 16 pages.
Connell II, Office Action Communication, U.S. Appl. No. 12/052,051, Jun. 26, 2009, 19 pages.
Connell II, Office Action Communication, U.S. Appl. No. 12/052,051, Sep. 8, 2008, 19 pages.
Connell II, Office Action Communication, U.S. Appl. No. 11/756,391, Dec. 2, 2008, 19 pages.
Reesen, Rick, "Virtual World Technologies to Manage a Grid—A Look at Some Realities, Concepts and Maybe Even the Future", Virtual Universe Community, Apr. 2, 2008, pp. 1-19.
Sahai, Akhil, "Towards Distributed and Dynamic Network Management", Network Operations and Management Symposium, vol. 2, Feb. 15, 1998, pp. 455-464.
Connell et al., "Item Scanning System", U.S. Appl. No. 11/782,173, filed Jul. 24, 2007.
Gennene, U.S. Appl. No. 12/055,466, Office Action Communication, Apr. 29, 2011, 16 pages.
Thatcher, U.S. Appl. No. 12/326,937, Office Action Communication, Oct. 18, 2011, 16 pages.
Gennene, U.S. Appl. No. 12/055,466, Office Action Communication, Nov. 21, 2011, 25 pages.
Thatcher, U.S. Appl. No. 12/326,937, Office Action Communication, Apr. 30, 2012, 14 pages.
Gennene, U.S. Appl. No. 12/055,466, Office Action Communication, May 10, 2012, 26 pages.
Gennene, Office Action Communication for U.S. Appl. No. 12/055,466 dated Dec. 6, 2012, 29 pages.
Sebe et al, "3D Video Surveillance with Augmented Virtual Environments," Nov. 2003, 6 pages.
Biber et al., "3D Modeling of Indoor Environments for a Robotic Security Guard," 2005, 7 pages.
Roberts, "Security Gets Physical," Jan. 2007, 7 pages, InfoWorld, vol. 29, Issue 5.
"C-Cure 9000 Event Management System," Nov. 2007, Archived by the Internet Wayback Machine, downloaded Sep. 22, 2011, from: http://web.archive.org/web/20071101081535/http://www.swhouse.com/products/software_CCURE9000.aspx.
Hanlon, "Panoptic C-Thru 3D Video Surveillance System," Jul. 2006, pp. 1-4, from: http://www.gizmag.com/go/6079.
Gennene, U.S. Appl. No. 12/055,466, Office Action Communication, Jun. 6, 2013, 26 pages.
Thatcher, U.S. Appl. No. 12/326,937, Office Action Communication, Oct. 11, 2013, 26 pages.
U.S. Appl. No. 12/055,466, Office Action, Nov. 29, 2013, 30 pages.

* cited by examiner

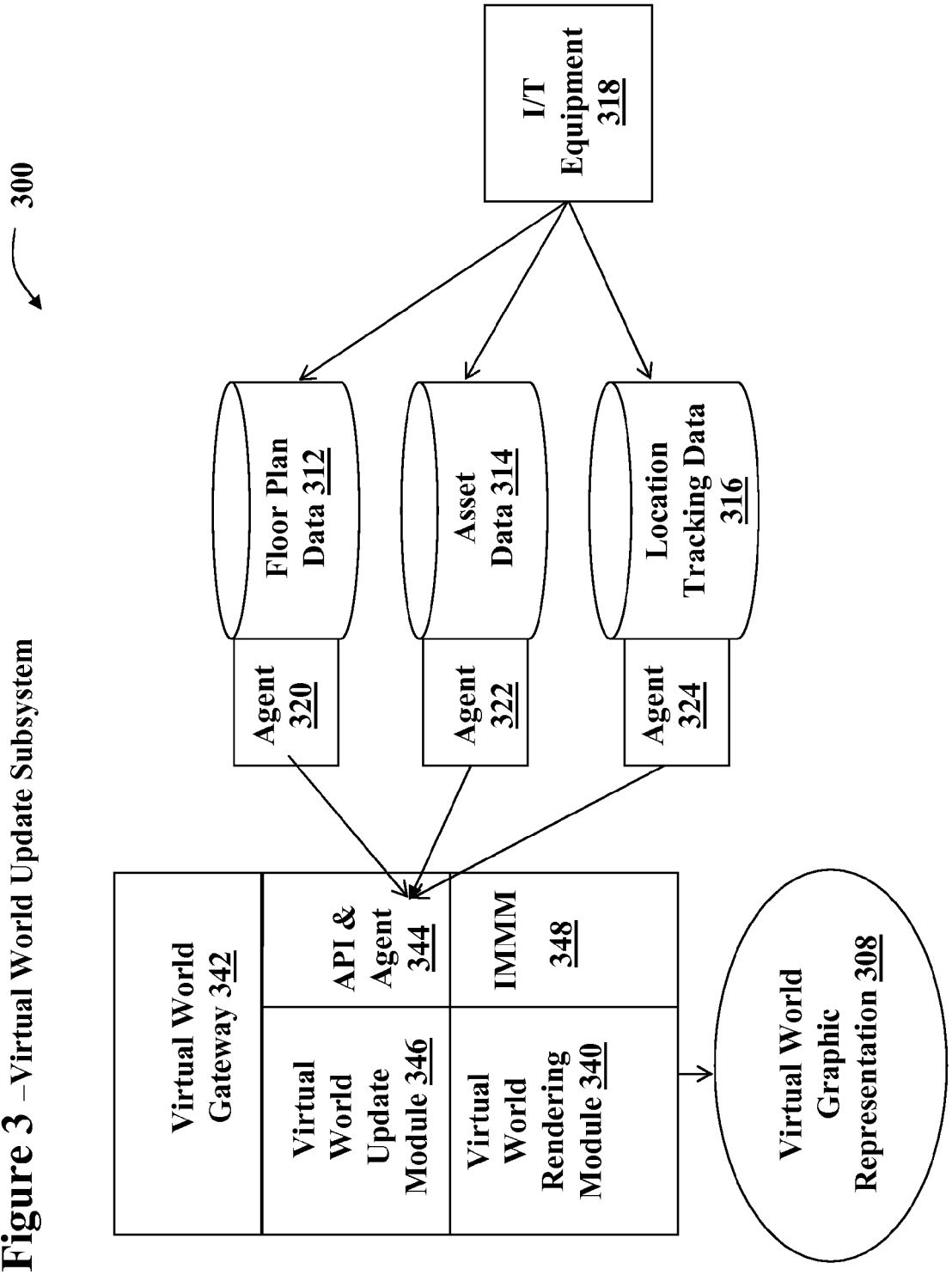
Figure 3 – Virtual World Update Subsystem

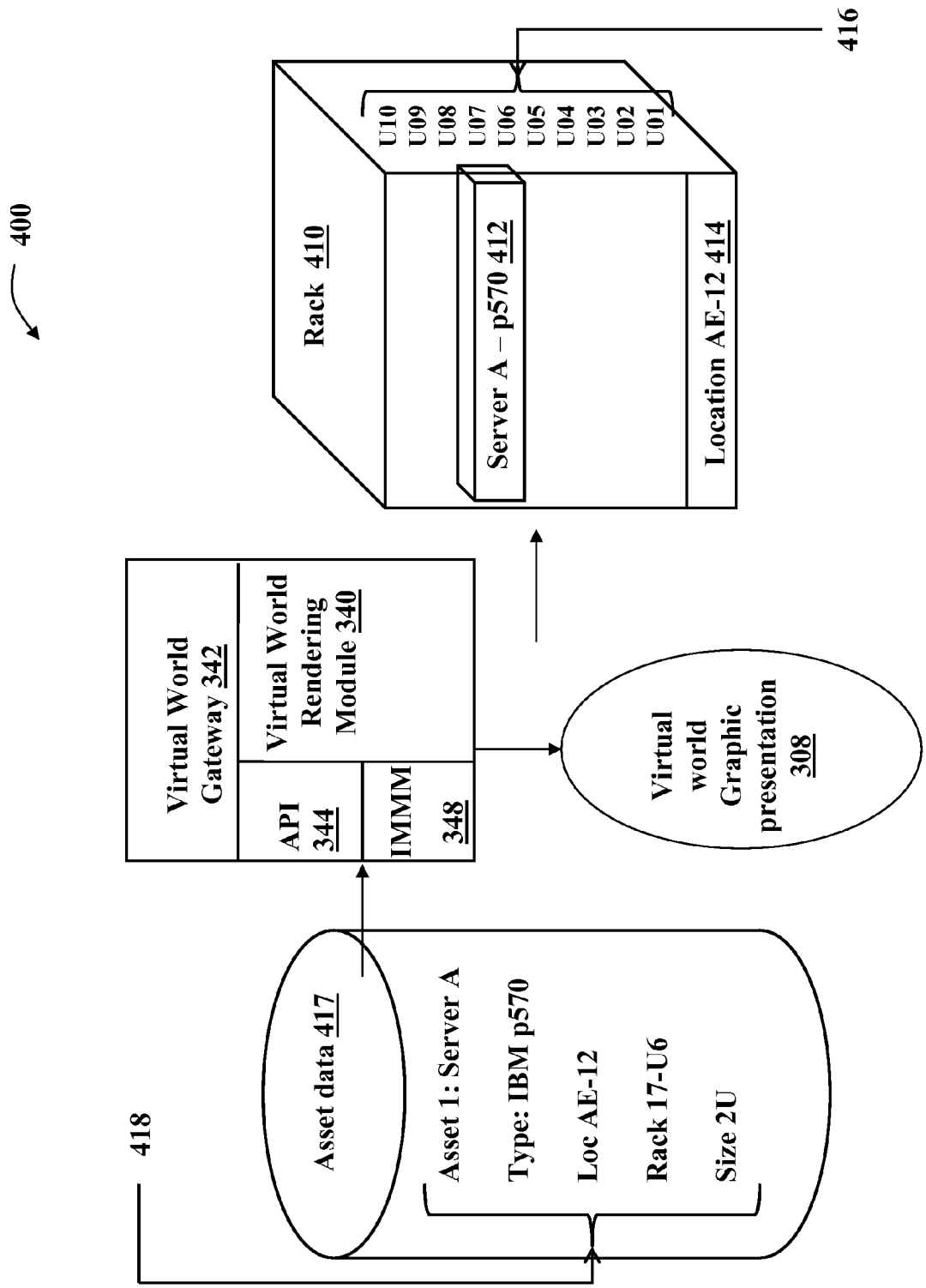
Figure 4 – Resource Rendering Example

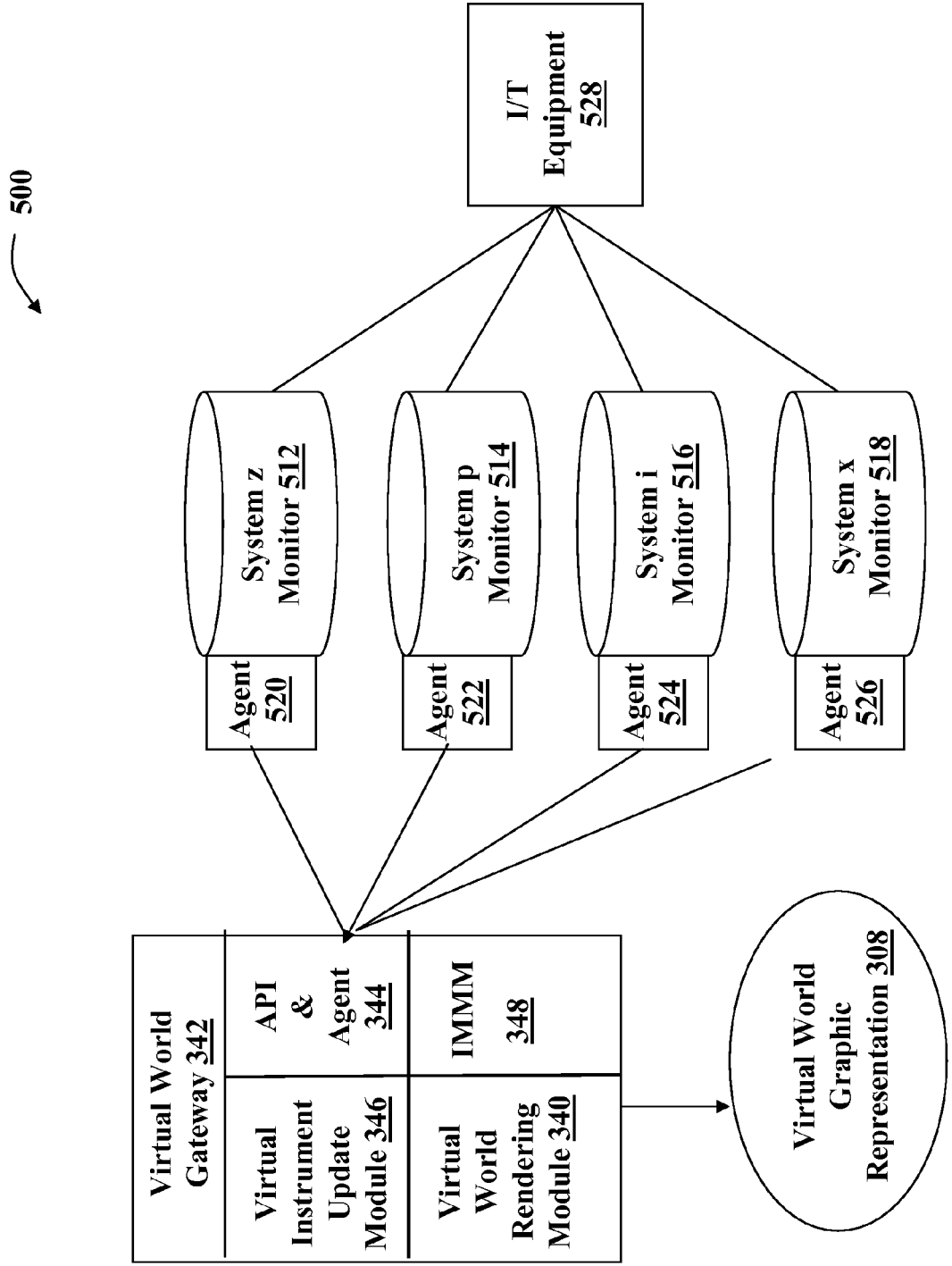
Figure 5 – Virtual World System Instrument Monitor and Management Subsystem

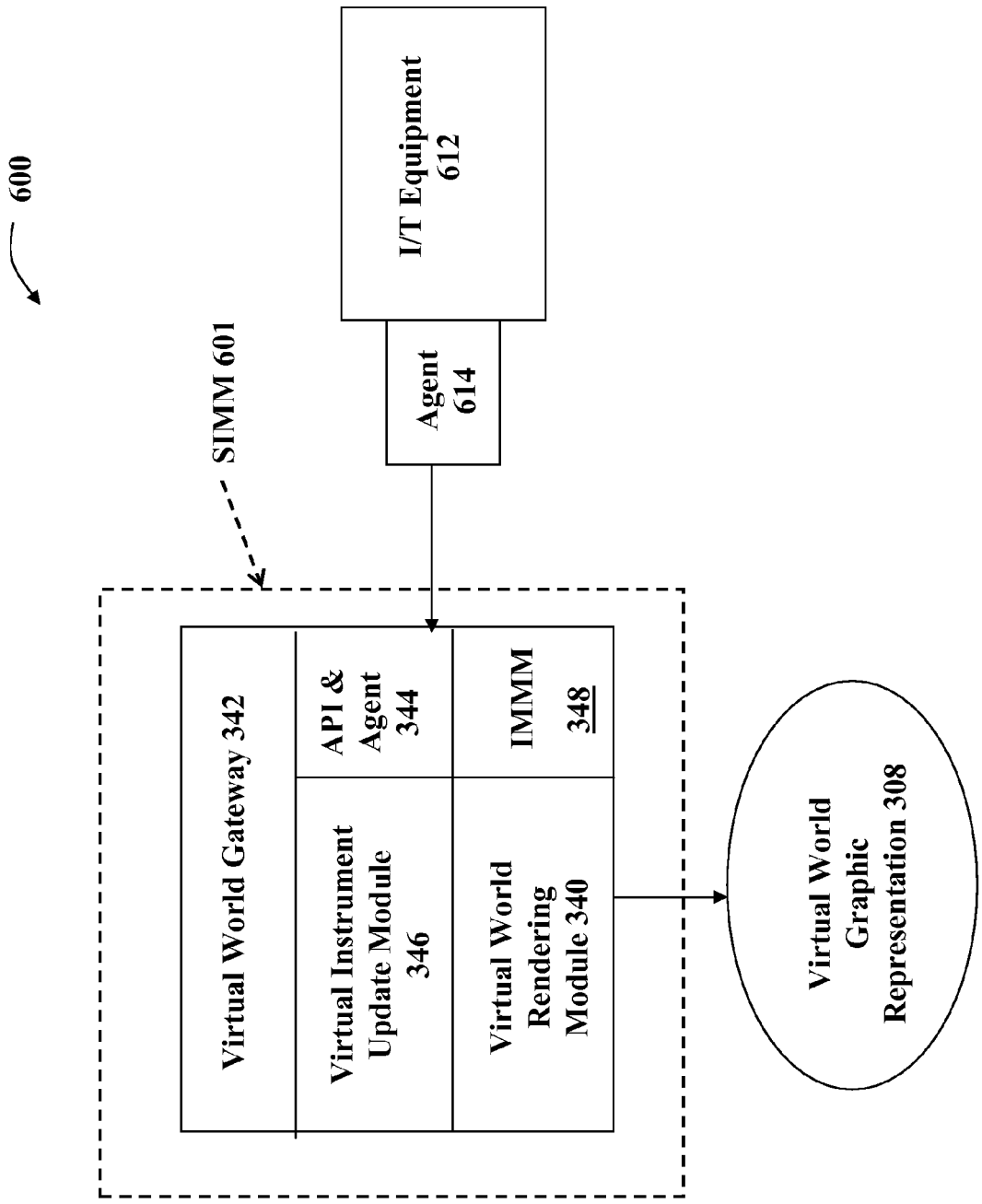
Figure 6 – Alternate Virtual World SIMM Embodiment

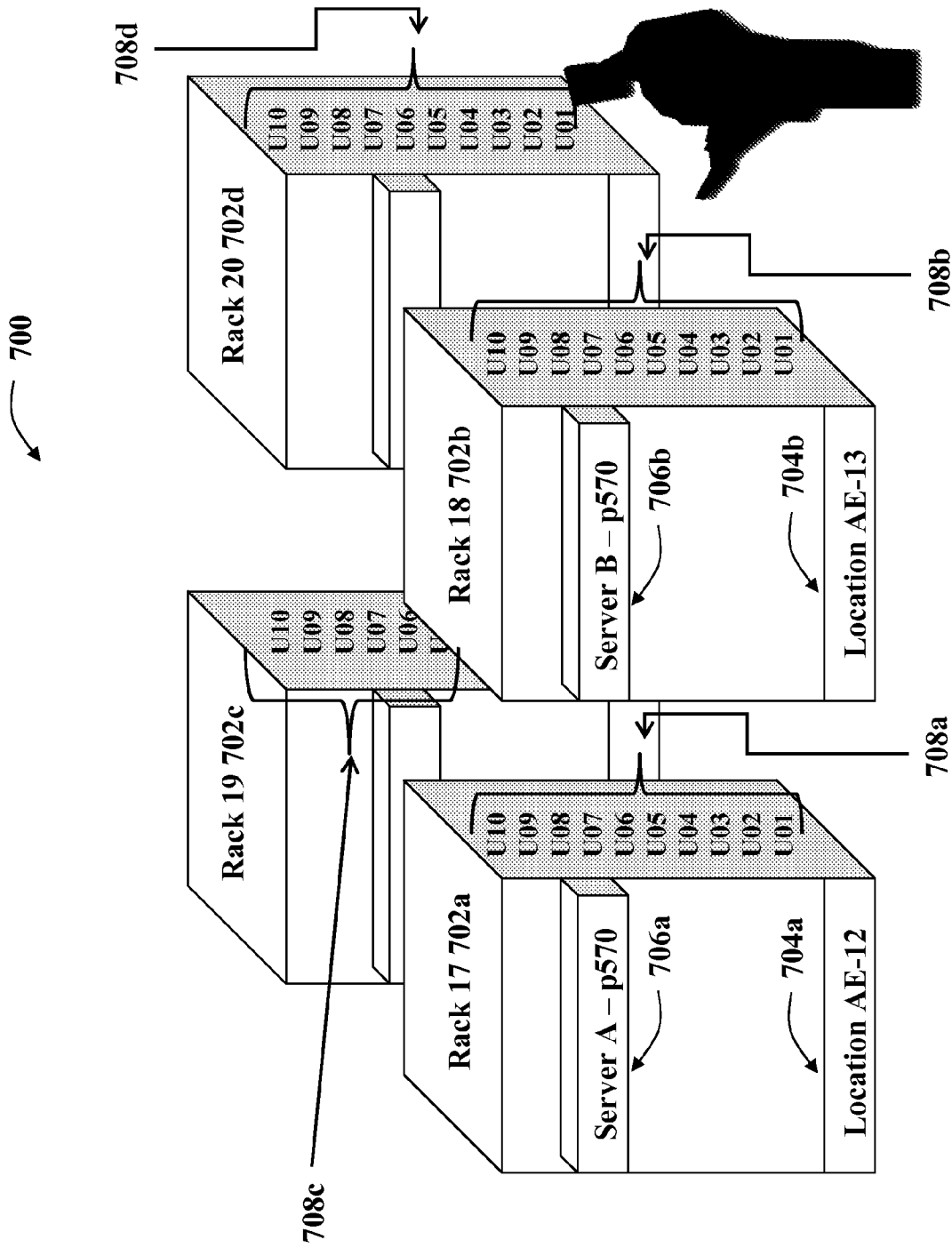
Figure 7 – Example 3D Data Center Room

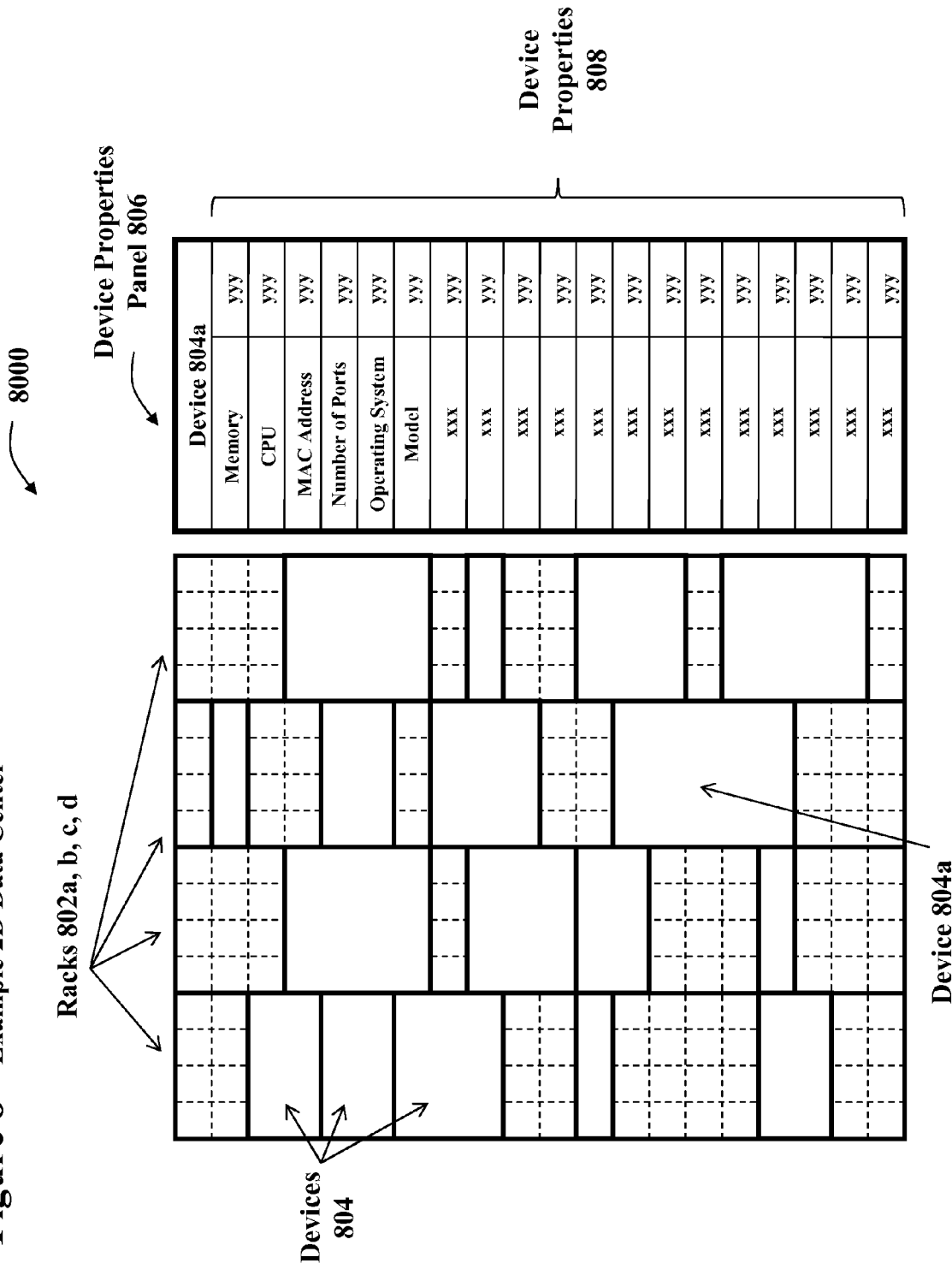
Figure 8 – Example 2D Data Center

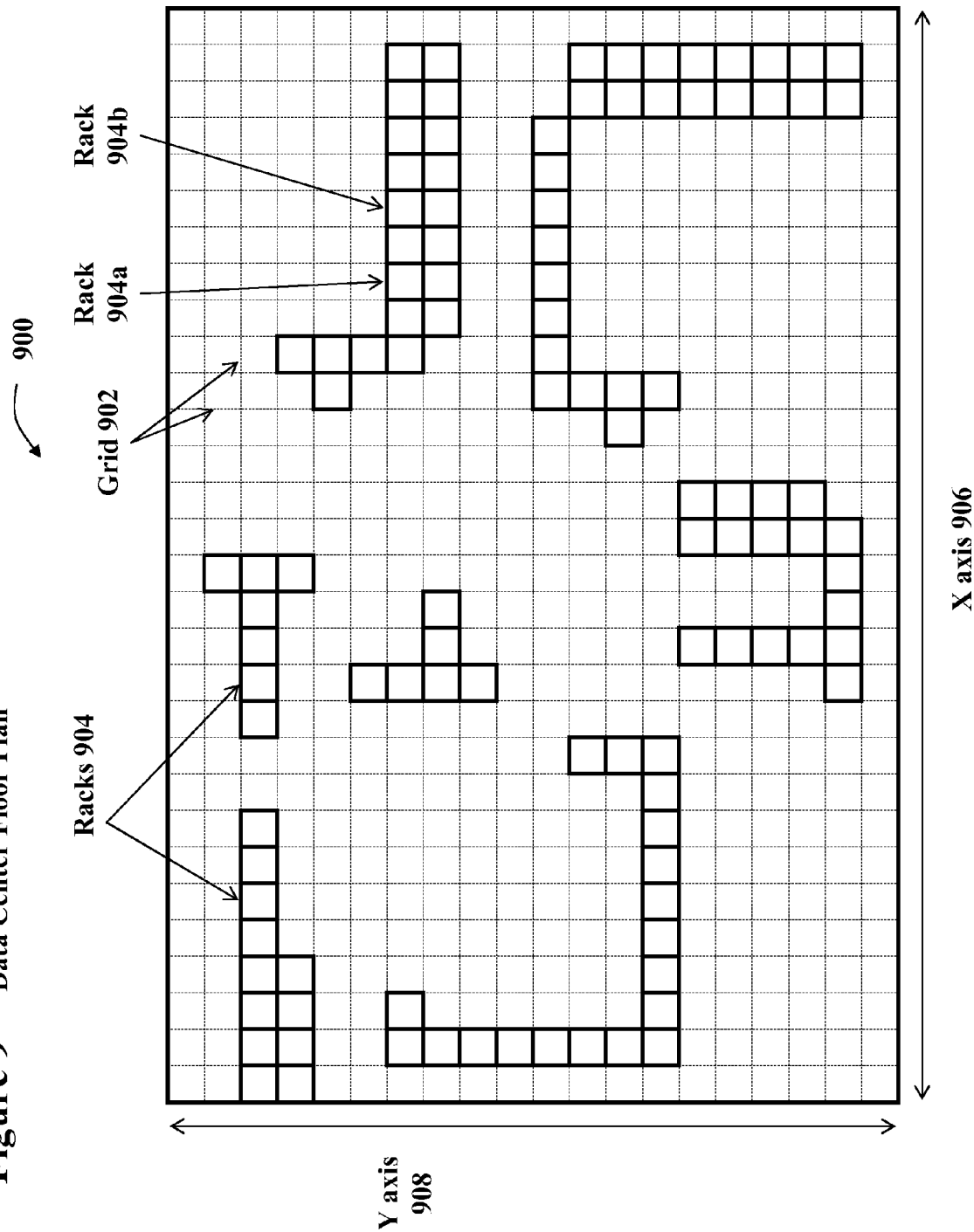
Figure 9 – Data Center Floor Plan

SYSTEM AND METHOD FOR MANAGING VIRTUAL WORLD ENVIRONMENTS BASED UPON EXISTING PHYSICAL ENVIRONMENTS

BACKGROUND OF THE INVENTION

1. Field of the Invention

The present invention provides a system and method for utilizing virtual environments to provide an accurate view of real world facilities and resources. Using the present invention, the two dimensional (2D) and three dimensional (3D) virtual renditions of physical resources are automatically created and managed to replicate real-life environments, such as computer data centers and other trackable assets.

2. Related Art

Information Technology (IT) systems are often housed in raised floor computer room areas within a data center environment. The servers and networking equipment are often stacked in racks and organized in rows. Many IT environments keep asset management databases recording the location and status of various assets, including servers and network devices. They may also have blueprints or floor plans showing the location of racks and equipment within a room. Tracking and documenting the location, relocation, upgrade, or replacement of equipment within a data center are typically done manually both in updating the asset databases and in updating the associated visual representations of the assets in their respective operating environments.

Physical management of servers, networking devices, and other mission-critical equipment within a data center is very challenging. As outsourcing and telecommuting become more popular, the staffs which manage these locations, increasingly work remotely, often even working from another country. Many times, such staff members have never visited or seen the data center building or raised floor IT area. Additionally, it is common practice for businesses to staff a primary production data center, where secondary back-up data centers may exist and be unstaffed. In most cases, again, supporting staff will not have seen or be familiar with the remote locations. A virtual world offers a way to set up an environment that allows staff and, optionally, others, to virtually view and to securely tour the I/T environments in question.

U.S. Ser. No. 12/055,466 filed on Mar. 26, 2008 describes a system wherein 2D and 3D virtual renditions of physical environments are automatically created to replicate the real-life environments, and are subsequently updated when physical changes occur within a data center. However, management of the real-life environment is not possible with this system. The present invention provides a method and system for management of the real-life environment and continuous update of the real-life environment.

It is noted that this disclosure focuses on I/T environments, such as computer rooms; however, many environments may suitable for monitoring and management from within a virtual world using this invention.

SUMMARY OF THE INVENTION

In general, the present invention discloses methods for creating, managing, updating and utilizing virtual worlds for enhanced management of an Information Technology (IT) environment. Two dimensional (2D) and three dimensional (3D) virtual world renditions are automatically created to replicate the associated real-life IT environment. A linkage between each I/T device and its 3D representation in a virtual world enables dynamic updating of the virtual world layout and content based on changes to the associated real-world data center. These virtual environments are automatically updated and can be managed from remote locations.

This invention comprises a system and methods of automatically creating and managing a virtual world environment to reflect a real world environment using information stored in databases and floor plans.

The present invention also provides related methods and/or program products.

BRIEF DESCRIPTION OF THE DRAWINGS

These and other features of this invention will be more readily understood from the following detailed description of the various aspects of the invention taken in conjunction with the accompanying drawings in which:

FIG. 3 shows an illustrative Virtual World System Instrument Monitor and Management Module according to the present invention.

FIG. 4 shows an illustrative Resource Rendering Example according to the present invention.

FIG. 5 shows an illustrative Virtual World System Instrument Monitor and Management Module according to the present invention.

FIG. 6 shows an illustrative Alternate Virtual World System Instrument Monitor and Management Module according to the present invention.

FIG. 7 shows an illustrative Example 3D Data Center Room according to the present invention.

FIG. 8 shows an illustrative example interactive 2D environment according to the present invention.

FIG. 9 shows an illustrative Data Center Floor Plan, which depicts a floor plan drawn on a grid according to the present invention.

Figure 1:
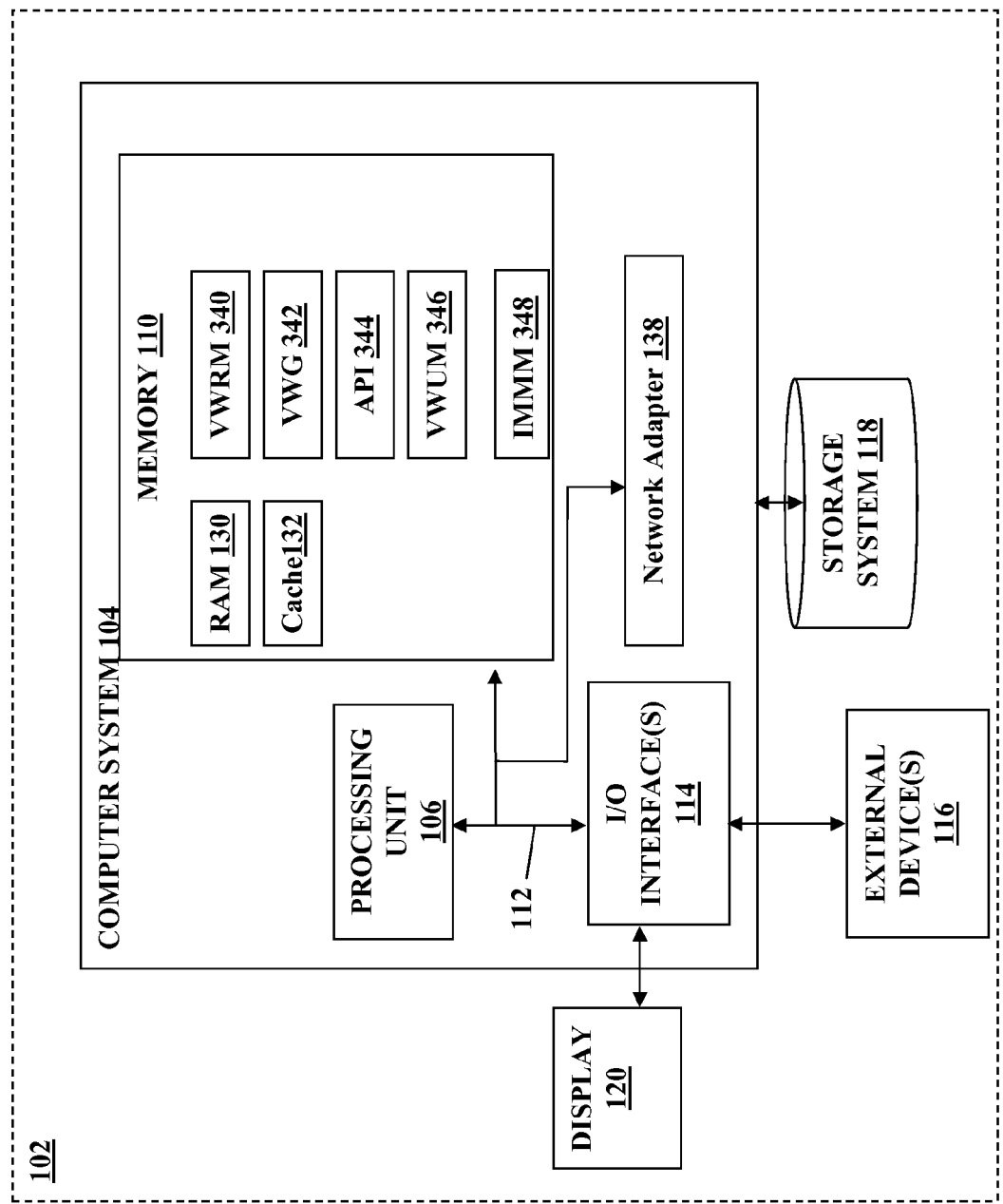
FIG. 1 shows a data processing system suitable for implementing the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

This invention discloses a system and method of utilizing virtual worlds for enhanced physical management of Information Technology (I/T) environments. The replica 2D and 3D virtual world environments are automatically updated to replicate real-life I/T environments. This invention comprises a system and method of automatically updating a virtual world environment to reflect that of the associated real world environment. The key unique components of this invention include:

1. Creation of linkage between each real world I/T device and its virtual world representation
2. Automated modification of virtual world environments based on change to associated real life physical assets.

A data processing system, such as that system 100 shown in FIG. 1, suitable for storing and/or executing program code of the present invention will include at least one processor (processing unit 106) coupled directly or indirectly to memory elements through a system bus. The memory elements can include local memory (RAM 130) employed during actual execution of the program code, bulk storage (storage system 118), and cache memories (cache 132) which provide temporary storage of at least some program code in order to reduce the number of times code must be retrieved from bulk storage during execution. Input/output or I/O devices (external devices 116) (including but not limited to keyboards, displays, pointing devices, etc.) can be coupled to the system either directly or through intervening I/O controllers (I/O Interface 114).

Figure 2:
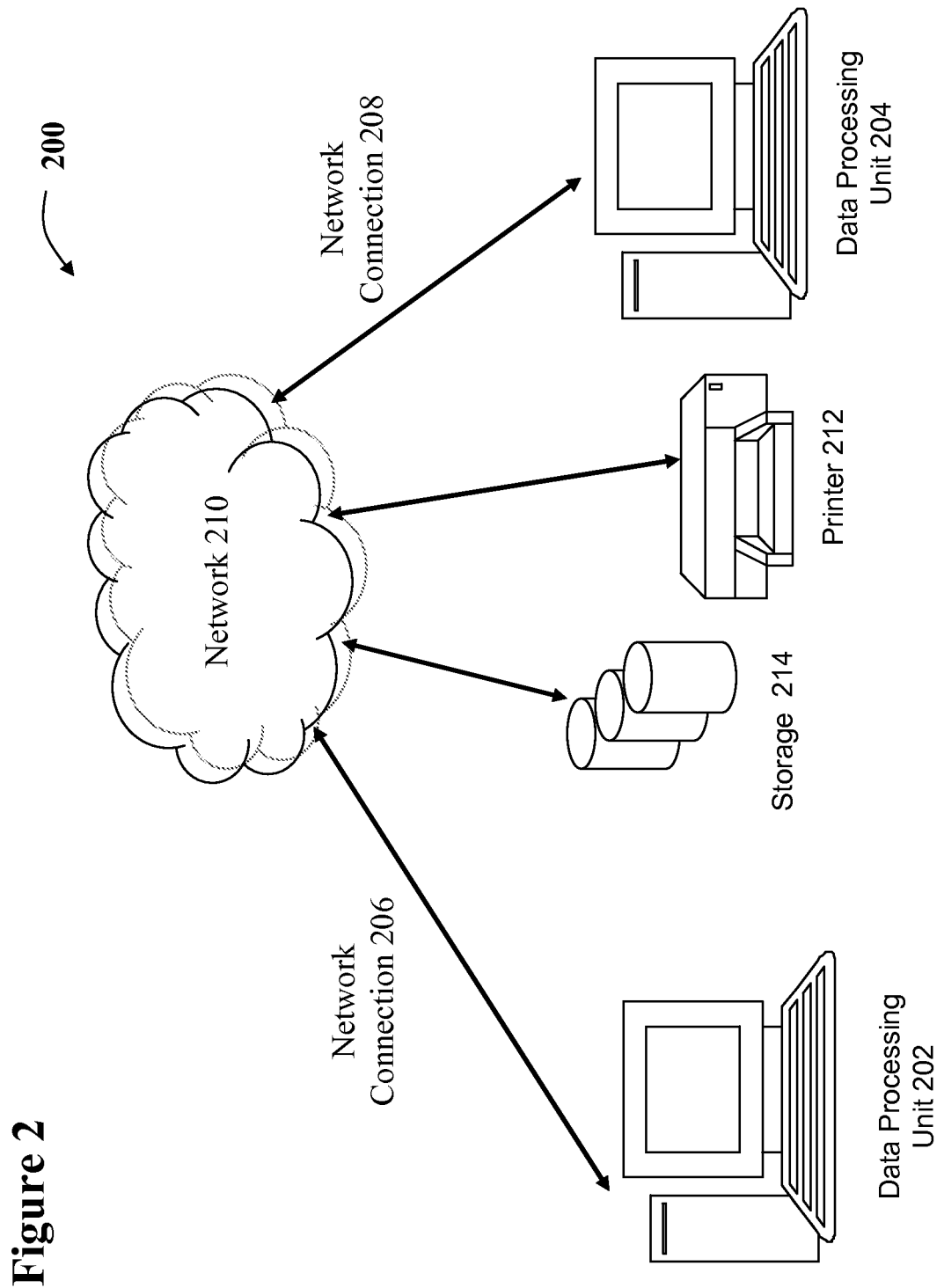
FIG. 2 shows a network that would work with the present invention.

Network adapters (network adapter 138) may also be coupled to the system to enable the data processing system (as shown in FIG. 2, data processing unit 202) to become coupled to other data processing systems (data processing unit 204) or remote printers (printer 212) or storage devices (storage 214) through intervening private or public networks (network 210). (A computer network is composed of multiple computers connected together using a telecommunication system for the purpose of sharing data, resources and communication. For more information, see http://historyoftheinternet.org/). Modems, cable modem and Ethernet cards are just a few of the currently available types of network adapters. (A network card, network adapter or NIC (network interface card) is a piece of computer hardware designed to allow computers to communicate over a computer network. It is both an OSI layer 1 (physical layer) and layer 2 (data link layer) device, as it provides physical access to a networking medium and provides a low-level addressing system through the use of MAC addresses. It allows users to connect to each other either by using cables or wirelessly.)

The primary logic element associated with this invention provides methods for automatic creation and management of 2D and 3D representations of a data center and each I/T device within the data center.

FIG. 3 depicts one possible embodiment 300 of this invention that utilizes a Virtual World Gateway (VWG) 342, acting as an interface between physical resources such as legacy I/T management systems (floor plan data 312, asset data 314 and location tracking data 316 of I/T Equipment 318, for example) and the Virtual World Rendering Module (VWRM) 340. The present invention includes an instrument monitor and management module (IMMM) 348, which runs on the VWG and each of the legacy physical resource systems. Each of the legacy I/T management systems (312, 314, 316 and API 344 have an agent (320, 322, 324, 344) for monitoring for changes to the real environment and passing the change data to the VWG 342 for processing. Virtual World Update Module (VWUM) 346 processes this change data and passes it to VWRM 340 and is processed as discussed above. The agents 320, 322, 324 and 344 thus allow for two-way communication between the legacy tracking systems the IMMM and the VWG. With the addition of IMMM, changes made to any of the legacy tracking systems are fed automatically to the collecting agent in the VWG 342, API 344 and directed to a Virtual World Update Module (VWUM) 346. As an object is removed, added, upgraded, or relocated in the real world environment and its legacy tracking data is updated, the corresponding 3D rendering of the virtual environment is automatically modified in order to synchronize with the real world change. The VWUM then determines what changes in rendering of the virtual world environment are required in order to synchronize the physical and virtual environments.

The present invention enables configuration and updating of many characteristics of devices, including IP address, file system size, server and storage virtualization, Logical Partitioning and load balancing pools.

The IMMM 348 can be implemented as an agent interface to the many existing system management tools and instruments currently available across I/T platforms such as IBM Tivoli Netview, HP Openview and Nimsoft NimBUS. Additionally, communication between disparate system platforms and management tools is enabled by industry standard protocols such as Simple Network Management Protocol, as well as numerous other open and proprietary protocols. An API and associated agent(s) in this invention, along with instrument definitions added to the VWG, allows for data from each disparate computing platform to be forwarded to the VWG in order to update the associate instrument, update virtual object data, and/or update object rendering where a visual change has occurred (LED change, indicator light illuminated or extinguished, button or level activated). The virtual world graphic presentation provides a single consolidated view of the data center, its current configurations, and the current status of each rack, server, and instrument.

The IMMM 348 also receives proposed changes from authorized users. When an authorized user wants to change the location of a real word device, the user inputs the change the IMMM and the IMMM generates a work order conforming to the change. This work order is sent to the physical location. When the work order is completed, the agent updates the new location of the real world device over the VWG. A confirmation is sent to the authorized user acknowledging completion of the change.

In one embodiment, Radio Frequency Identification (RFID) transmitters are used to track the location of items within the data center, and the legacy databases are updated by RFID monitors. For example, within a data center, computer servers and networking devices may be tagged with RFID transmitters that are monitored by RFID monitors within the data center. This allows the asset tracking systems to be automatically updated via the RFID monitors when physical equipment changes occur. In this embodiment, the VWG is also updated using the agents introduced in this invention after the RFID monitors have updated the legacy data sources.

The legacy data sources are updated via an automated tracking method such as RFID, and this invention captures that change via the IMMM, which communicates the change to the VWG.

Many standards exist in the I/T industry, such that, creating an API 344 to translated standard I/T data (floor plan data 312, asset data 314, location tracking data 316) to the Virtual World Rendering Module 346 is possible. The Virtual World Gateway 342 receives descriptive resource data (floor plan data 312, asset data 314, location tracking data 316) through the API 344 from a legacy source (agents), translates that data so that it is understood by the VWRM 340, which in turn creates the Virtual World Graphic Representation 308 of the resource. As noted above, FIG. 3 depicts these logical relationships.

The following section provides step-by-step example logic included in the VWG.

Rendering a 3D Virtual Environment from Real World Data

1) Create or access existing asset databases for equipment.
2) Create blueprint (floor plan) showing location of equipment within the room. (See Rendering a Room from Blueprints method below and FIG. 4).
3) Create prepackaged building blocks for virtual world representation of objects based on standard definitions. Prepackaged building blocks are 2D and 3D representations of a device. For example, a 2D representation of an IBM System p570 server may be in .gif format. A 3D representation would be an object created for use in a virtual world.

4) Sort data in asset database by unique ID—floor, row, rack, etc.

5) Build 3D environment by rack, row, floor.
   a. Import data from asset DB into VWG API 344, Simulator software, or other software entity.
   b. Build floor space based on blueprint or location data (See Rendering a Room from Blueprints method below).
   c. Build empty rack frame using rack virtual world object of appropriate dimension and type.
   d. For each individual piece of equipment:
      i. Populate rack with 3D object to represent a device
      ii. Populate 3D object with metadata from asset DB (for example: IP address, type and number of CPUs, amount of memory, etc.)
   e. Repeat steps c and d for each room or designated area until all racks and devices have logical representations capable of being rendered Rendering a Room from Blueprints:

For each item, one possible implementation may include:

1. A 2D floor plan is built on a grid so that the system automatically knows where to place the equipment in the 3D world. (See FIG. 9—Data Center Floor Plan, which depicts a floor plan 900 drawn on a grid 902 illustrating racks 904.)

2. Record coordinates of each item (such as rack 904*a*, rack 904*b*) from floor plan. This includes x,y placement of corners of items (along X axis 906, Y axis 908) or x,y coordinate of upper left corner and dimensions.

3. Optionally, convert coordinate data to table format or convert directly from blueprint.

4. Use coordinates from plan data or table to place equipment in correct location in 3D rendering of the room.

FIG. 7 depicts the resultant interactive 3D environment that is created. Racks 17, 18, 19, 20 (702*a*, 702*b*, 702*c*, 702*d*) with racks 17, 18 (702*a*, 702*b*) holding IT devices Server A—p570 706*a*, Server B—p570 706*b* in locations Location AE-12 704*a*, Location AE-13 704*b*.

FIG. 8 depicts the resultant interactive 2D environment that is created. Devices 804 are shown positioned in racks 802 and, as users click or otherwise select a device 804*a* located in a rack 802*c*, its properties 808 are displayed. In this example, it occurs on the panel 806 to the right. "xxx" and "yyy" denote further properties and associated property values respectively. This 2D environment view is a helpful tool for the systems administrators, as it may be saved to a file, printed, and used to display equipment in other traditional 2D formats.

Managing a 3D Virtual Environment from Real World Data

After each room or designated area has been rendered, the IMMM automatically updates changes through a two-way communication system. The IMMM also allows management of the designated area by authorized users. The IMMM will generate a work order sent to the physical location when a change in the actual room or area is submitted by authorized personnel. When the IMMM receives a change request a work order is generated and sent to the physical location-receiving center. When the work is completed the VWGR is updated automatically the modified item automatically updates its position.

FIG. 4 depicts example logic flow 400 for rendering a physical resource (asset data 417) based on input 418 from a legacy asset database 417. VWG 342, API 344, VWRM 340 and IMMM 348 operate and interact as discussed in relation to FIG. 3 to create VWRP 308. Input 418 comprises such data as Asset 1: Server A; Type: IBM p570; Loc AE-12; Rack 17-U6 and Size 2U. This data is used by VWG 342, API 344, VWRM 340 and IMMM 348 to create VWRP 308 which is shown as Rack 410, having Server A—p570 412, and having a location of AE-12 414.

Updating Virtual Environment as Real Environment Changes Occur:

In order to update the current rendering of a virtual environment, FIG. 5 illustrates a system for monitoring Systems z, p, i, x of I/T Equipment 528 utilizing System z Monitor 512, System p Monitor 514, System i Monitor 516, and System x Monitor 518. Like System 300 of FIG. 3, Agents 520, 522, 524, 526 pass this data to VWG 342 for processing by Virtual Instrument Update Module 346 and Virtual World Rendering Module 340 and Instrument Monitoring and Management Module 348 to update the Virtual World Graphic Representation 308.

FIG. 6 illustrates an Alternate Virtual World SIMM Embodiment 600 wherein I/T Equipment 612 has its own Agent 614 for monitoring the configuration and changes to the configuration and passes this data directly to SIMM 601 having VWG 342, VIUM 346, API & Agent 344, IMMM 348 and VWRM 340 for producing VWGR 308 per prior discussions above.

It should be understood that the present invention is typically computer-implemented via hardware and/or software. As such, and client systems and/or servers will include computerized components as known in the art. Such components typically include (among others), a processing unit, a memory, a bus, input/output (I/O) interfaces, external devices, etc. It should also be understood that although a specific embodiment involving 2D and 3D virtual renditions of physical resources that are automatically created to replicate real-life environments, such as computer data centers and other trackable assets has been depicted and described, the present invention could be implemented in conjunction with any type of real-life environments having trackable assets.

While shown and described herein as a system and method for utilizing virtual environments to provide an accurate view of real world facilities and resources, it is understood that the invention further provides various alternative embodiments. For example, in one embodiment, the invention provides a computer-readable/useable medium that includes computer program code to enable a computer infrastructure. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for utilizing virtual environments to provide an accurate view of real world facilities and resources. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for creating and managing a virtual rendition of a real-life information technology (I/T) environment in a system having a gateway, a virtual rendition rendering module, an instrument monitor, a virtual update module and instrument monitor and management module (IMMM), the method comprising the steps of:
   a. at the gateway, receiving descriptive resource data from at least one information technology (I/T) physical resource, the descriptive resource data comprising a physical location of the at least one I/T physical resource in the real-life I/T environment;
   b. at the gateway, translating the descriptive resource data so that it is understood by the virtual rendition rendering module;
   c. at the rendering module, creating a virtual rendition of the at least one I/T physical resource, creating a floor plan of a room in which the at least one I/T physical resource is located showing location of the at least one I/T physical resource within the room, and creating a 2D representation and a 3D representation of the at least one I/T physical resource within the room;
   d. at the IMMM receiving a change request for the at least one I/T physical resource to be modified, wherein the change request includes a request for a change in the physical location of the at least one I/T physical resource in the real-life I/T environment;
   e. based on the change request, generating, in response to receiving the change request, a work order to be sent to the physical location;
   f. receiving, in response to completion of the work order, at the virtual update module updated descriptive resource data reflecting completion of the change request corresponding to the work order;
   g. at the rendering module, creating, in response to receiving the updated descriptive resource data, an updated virtual rendition of the at least one I/T physical resource reflecting completion of the change request;
   repeating steps a through g for a plurality of I/T physical resources each having at least one physical location, wherein a plurality of physical location data includes floor, row, and rack data and wherein step c) further comprises: sorting the plurality of physical location data by unique ID; and
   building the 3D representation by at least one rack, at least one row, and at least one floor;
   building the at least one floor including at least one row based on a blueprint;
   building at least one rack, wherein the rack is empty;
   for each I/T physical resource:
      populating the at least one rack with a 3D object representing each I/T physical resource; and
      populating the 3D object with metadata associated with each I/T physical resource, wherein the metadata includes an IP address, a type and quantity of CPU, and an amount of memory; and
      determining, based on the floor plan, where to place the plurality of I/T physical resources in the 3D representation, and wherein the step of determining further comprises:
         recording coordinates of each I/T physical resource from the floor plan including x, y placement of corners of each I/T physical resource, or x, y coordinate of upper left corner and dimensions; and
         using the coordinates to place the plurality of I/T physical resources in correct locations in the 3D representation of the room.

2. The method of claim 1 wherein the receiving a change request at the IMMM comprises receiving a change request from a remote location.

3. The method of claim 1, wherein the at least one physical resource includes an RFID transmitter; and wherein the receiving of updated descriptive resource data at the virtual update module includes receiving information from the RFID transmitter.

4. A computer program product stored in a non-transitory computer readable storage medium for operating in a system comprising a network I/O, a CPU, and one or more databases, the computer program product, when executed, enabling the system to implement a method for automatically creating and managing virtual renditions of a real-life information technology (I/T) environment in a system having a virtual world gateway, a virtual world rendering module, a virtual update module, and an instrument monitor and management module (IMMM), the method comprising the steps of:
   a. at the virtual world gateway, receiving descriptive resource data from the at least one information technology (I/T) physical resource, wherein the descriptive resource data comprises a physical location of the at least one I/T physical resource in the real-life I/T environment;
   b. at the virtual world gateway, translating the data so that it is understood by the virtual world rendering module; and
   c. at the virtual world rendering module, creating a virtual rendition of the at least one I/T physical resource, creating a floor plan of a room in which the at least one I/T physical resource is located showing location of the at least one I/T physical resource within the room, and creating a 2D representation and a 3D representation of the at least one I/T physical resource within the room, wherein the floor plan is based on a grid;
   d. at the IMMM receiving a change request for the at least one I/T physical resource to be modified, wherein the change request includes a request for a change in the physical location of the at least one physical I/T resource in the real-life I/T environment;

e. based on the change request, generating, in response to receiving the change request, a work order to be sent to the physical location;
f. receiving, in response to completion of the work order, at the virtual update module reflecting completion of the change request corresponding to the work order; and
g. at the rendering module, creating, in response to receiving the updated descriptive resource data, an updated virtual rendition of the at least one I/T physical resource reflecting completion of the change request;
repeating steps a through g for a plurality of I/T physical resources each having at least one physical location, wherein a plurality of physical location data includes floor, row, and rack data and wherein step c) further comprises: sorting the plurality of physical location data by unique ID;
building the 3D representation by at least one rack, at least one row, and at least one floor;
building the at least one floor including at least one row based on a blueprint;
building at least one rack, wherein the rack is empty;
for each I/T physical resource:
    populating the at least one rack with a 3D object representing each I/T physical resource; and
    populating the 3D object with metadata associated with each I/T physical resource, wherein the metadata includes an IP address, a type and quantity of CPU, and an amount of memory; and
    determining, based on the floor plan, where to place the plurality of I/T physical resources in the 3D representation, and wherein the step of determining further comprises:
        recording coordinates of each I/T physical resource from the floor plan including x, y placement of corners of each I/T physical resource, or x, y coordinate of upper left corner and dimensions; and
        using the coordinates to place the plurality of I/T physical resources in correct locations in the 3D representation of the room.

5. The computer program product of claim 4, wherein the at least one physical resource includes an RFID transmitter; and wherein the receiving of updated descriptive resource data at the virtual update module includes receiving information from the RFID transmitter.

6. A system for creating and managing two dimensional (2D) and three dimensional (3D) virtual world graphic representations of a real-life information technology (I/T) environment, the system comprising:
a. a virtual world gateway for receiving descriptive resource data from a plurality of information technology (I/T) physical resources, the descriptive resource data comprising a physical location of each I/T physical resource in the real-life I/T environment;
b. a virtual world rendering module for translating the descriptive resource data so that it is understood by the virtual rendition rendering module and creating a virtual rendition of each I/T physical resource
c. an instrument monitor and management module (IMMM) for receiving
    a change request for each I/T physical resource to be modified, wherein the change request includes a request for a change in the physical location of each I/T physical resource in the real-life I/T environment;
    generating, in response to receiving the change request, a work order to be sent to the physical resource location based on the change request;
    receiving, in response to completion of the work order, the updated descriptive resource data reflecting completion of the change request corresponding to the work order, and
    sending, in response to the receiving, the updated descriptive resource data to the virtual world rendering model, wherein the virtual world rendering model creates, in response to receiving the updated descriptive resource data, an updated virtual rendition of each I/T physical resource reflecting completion of the change request, wherein each of the plurality of I/T physical resources has physical location data including floor, row, and rack data, and
wherein the virtual world rendering module sorts the plurality of physical location data by unique ID, and
builds the 3D representation by at least one rack, at least one row, and at least one floor,
determines, based on the floor plan, where to place the plurality of I/T physical resources in the 3D representation, and
wherein the determining further comprises:
    recording coordinates of each I/T physical resource from the floor plan including x, y placement of corners of each I/T physical resource, or x, y coordinate of upper left corner and dimensions; and
    placing the plurality of I/T physical resources in correct location in the 3D representation of the room based upon the x, y, recorded coordinates, wherein building the 3D representation further comprises:
    building at least one floor including at least one row based on a blueprint;
    building at least one rack, wherein the rack is empty;
    for each I/T physical resource:
        populating the at least one rack with a 3D object representing each I/T physical resource; and
        populating the 3D object with metadata associated with each I/T physical resource, wherein the metadata includes an IP address, a type and quantity of CPU, and an amount of memory.

7. The system of claim 6 further comprising an application programming interface (API), connected between the virtual world gateway and each I/T physical resource, for receiving the descriptive resource data from each I/T physical resource and passing the descriptive resource data to the virtual world gateway.

8. The system of claim 7 wherein the at least one database has an agent for monitoring the descriptive resource data and the API comprises an agent for monitoring outputs from the at least one database agent.

9. The system of claim 6 further comprising at least one database for storing the descriptive resource data prior to sending the descriptive resource data to the virtual world gateway.

10. The system of claim 6, wherein each I/T physical resource includes an RFID transmitter; and wherein the receiving of updated descriptive resource data at the virtual update module includes receiving information from the RFID transmitter.

* * * * *